US012348565B2

(12) United States Patent
Okada

(10) Patent No.: US 12,348,565 B2
(45) Date of Patent: Jul. 1, 2025

(54) ATTACK DETECTION SYSTEM

(71) Applicant: TOYOTA JIDOSHA KABUSHIKI KAISHA, Toyota (JP)

(72) Inventor: Kazuya Okada, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 18/499,757

(22) Filed: Nov. 1, 2023

(65) Prior Publication Data

US 2024/0155002 A1    May 9, 2024

(30) Foreign Application Priority Data

Nov. 7, 2022   (JP) .................................. 2022-178333

(51) Int. Cl.
*H04L 9/40* (2022.01)
*H04L 67/12* (2022.01)

(52) U.S. Cl.
CPC .......... *H04L 63/1491* (2013.01); *H04L 67/12* (2013.01)

(58) Field of Classification Search
CPC .. H04L 63/1491; H04L 67/12; H04L 63/1425
See application file for complete search history.

(56) References Cited

U.S. PATENT DOCUMENTS

| | | | | |
|---|---|---|---|---|
| 10,382,483 | B1* | 8/2019 | Kafri | H04L 63/1491 |
| 11,038,920 | B1* | 6/2021 | Sellers | H04L 63/1433 |
| 2004/0172557 | A1* | 9/2004 | Nakae | H04L 63/20 726/22 |
| 2005/0166072 | A1* | 7/2005 | Converse | H04L 63/1441 726/5 |
| 2006/0101515 | A1* | 5/2006 | Amoroso | H04L 43/00 726/23 |
| 2006/0112174 | A1* | 5/2006 | L'Heureux | H04L 67/565 709/225 |
| 2006/0288414 | A1* | 12/2006 | Kuroda | G06F 21/567 726/24 |
| 2008/0163354 | A1* | 7/2008 | Ben-Shalom | H04L 63/1491 726/12 |
| 2016/0219051 | A1 | 7/2016 | Morita et al. | |
| 2019/0373476 | A1* | 12/2019 | High | G05D 1/0212 |
| 2020/0374087 | A1* | 11/2020 | Vissamsetty | H04L 63/0272 |
| 2021/0067553 | A1* | 3/2021 | Ries | H04L 63/0263 |

(Continued)

FOREIGN PATENT DOCUMENTS

| | | |
|---|---|---|
| JP | 2013-009185 A | 1/2013 |
| JP | 2016-139883 A | 8/2016 |

*Primary Examiner* — Javier O Guzman
(74) *Attorney, Agent, or Firm* — Oliff PLC

(57) ABSTRACT

A first controller of a first device monitors communication to a first vehicle connected to the network. Further, when it is detected that an attack on the first vehicle is being carried out from the attack source device, the first controller transmits a first command for activating a honeypot server simulating a vehicle system of the first vehicle to the second device and transmits a second command for transferring packets transmitted from the attacking device to the first vehicle to the second device to a communication device that relays communication to the first vehicle in the network. Further, a second controller of a second device processes packets transmitted from the attack source device to the first vehicle and transferred to the second device by the communication device.

4 Claims, 7 Drawing Sheets

(56) References Cited

U.S. PATENT DOCUMENTS

| | | | |
|---|---|---|---|
| 2022/0239694 A1* | 7/2022 | Gehrer | H04L 67/125 |
| 2022/0311784 A1* | 9/2022 | Vandikas | H04L 63/1425 |
| 2023/0090242 A1* | 3/2023 | Duplys | H04L 67/51 |
| | | | 709/224 |
| 2023/0179606 A1* | 6/2023 | Paluch | G06F 21/554 |
| | | | 726/22 |
| 2023/0208810 A1* | 6/2023 | Dhanasekar | H04L 63/1416 |
| | | | 726/26 |
| 2023/0362194 A1* | 11/2023 | Lai | H04L 63/1491 |
| 2024/0314169 A1* | 9/2024 | Azad | H04L 63/1491 |

* cited by examiner

ATTACK DETECTION SYSTEM

CROSS REFERENCE TO THE RELATED APPLICATION

This application claims the benefit of Japanese Patent Application No. 2022-178333, filed on Nov. 7, 2022, which is hereby incorporated by reference herein in its entirety.

BACKGROUND

Technical Field

Present disclosure relates to network security.

Description of the Related Art

There are technologies to protect a vehicle connected to the network from attack. In this regard, for example, Patent Literature 1 discloses a communication system that detects that an unauthorized device is connected to the network and blocks communication performed by the device.

CITATION LIST

Patent Literature

Patent Literature 1: Japanese Patent Laid-Open No. 2016-139883
Patent Literature 2: Japanese Patent Laid-Open No. 2013-009185

SUMMARY

The purpose of present disclosure is to protect a connected vehicle from attacks.

The first aspect of the present disclosure may be an attack detection system comprising a first device and a second device, wherein the first device having a first controller configured to execute: monitoring communication to a first vehicle connected to a network, and when it is detected that an attack on the first vehicle is being carried out from an attack source device, transmitting a first command for activating a honeypot server simulating a vehicle system of the first vehicle to the second device and transmitting a second command for transferring packets transmitted from the attacking device to the first vehicle to the second device to a communication device that relays communication to the first vehicle in the network, and the second device having the second controller configured to execute: processing, by the honeypot server, the packets transmitted from the attack source device to the first vehicle and transferred to the second device by the communication device.

Other aspects include a method executed by the above apparatus, a program for causing the method to be executed by a computer, or a computer-readable storage medium in which the program is stored non-temporarily.

According to the present disclosure, a connected vehicle can be protected from attacks.

DESCRIPTION OF THE EMBODIMENTS

Figure 1:
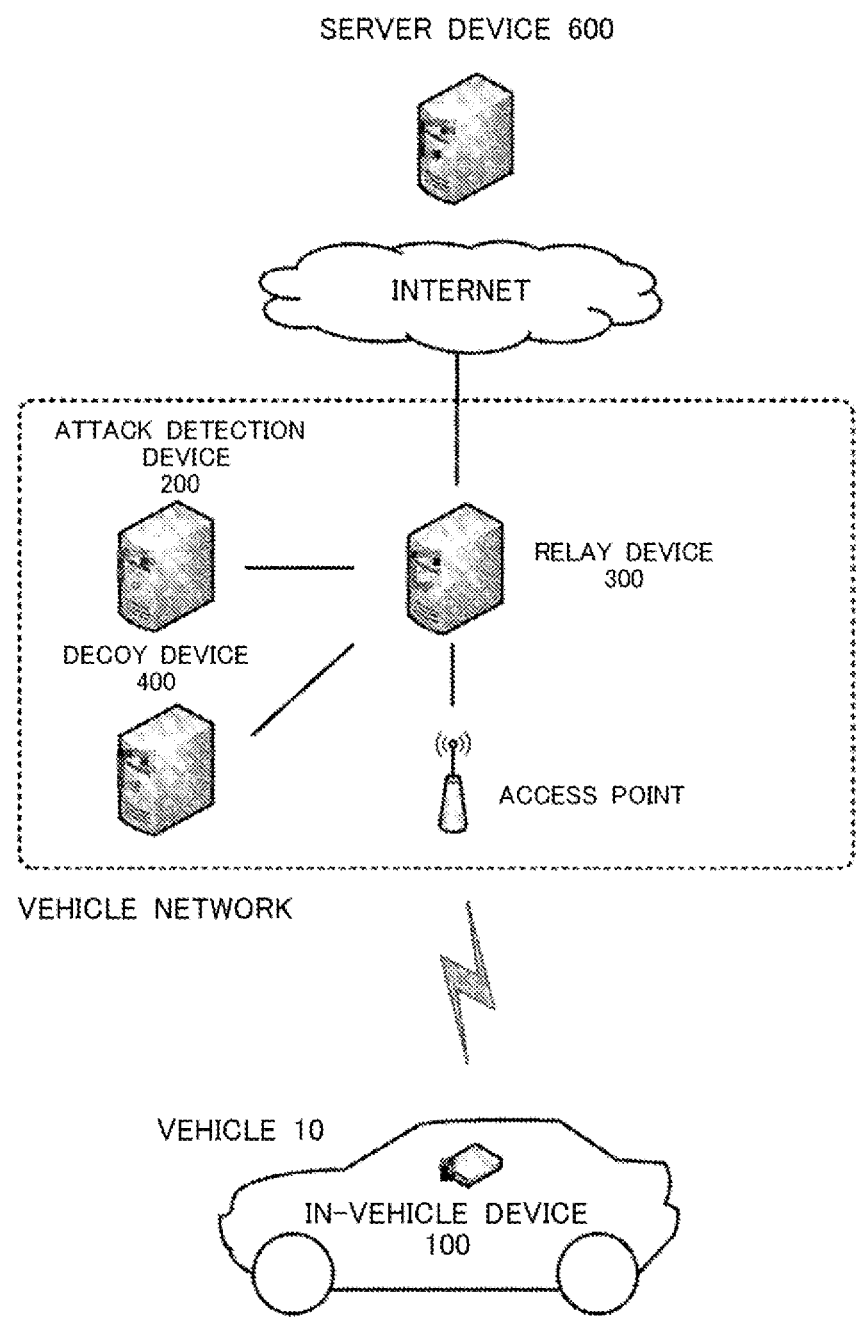
FIG. 1 is an outline diagram of a communication system according to the first embodiment.

In recent years, vehicles have become increasingly connected, and the number of vehicles that can use wireless network connections has increased. By communication between the vehicle and the server device, it is possible to provide the vehicle with information that contributes to traffic safety and the latest traffic information.

In such a system, attacks over the network can be a problem. For example, an attack such as sending illegal traffic information or stealing data transmitted from the vehicle may be performed on a certain vehicle. Attacks include vulnerability scanning and brute force attacks to attempt to break into a vehicle system.

A technique for detecting that an attack has been made against a specific device via a network is known. However, when an attack is detected, for example, if communication is immediately blocked, the attacker can recognize that it has been removed from the network, so the attack method and source may be changed and the attack may be continued. In other words, you may fall into a cat-and-mouse game of attack and defense. The information processing apparatus according to one aspect of the present disclosure solves such problems.

The attack detection system according to the first aspect of the present disclosure is a system that includes a first device and a second device.

Specifically, the first device has a first controller. The first controller monitors communication to the first vehicle connected to the network. Further, when it is detected that an attack on the first vehicle is being carried out from an attack source device, the first controller transmits a first command to the second device for activating a honeypot server simulating a vehicle system of the first vehicle, and transmits a second command for transferring packets transmitted from the attacking device to the first vehicle to the second device to a communication device that relays communication to the first vehicle in the network. Also, the second device has a second controller. The second controller processes, by the honeypot server, packets transmitted from the attack source device to the first vehicle and transmitted by the communication device.

The honeypot server is a server having a function of virtually simulating the vehicle system of the first vehicle that is the attack target. The honeypot server may be implemented by software.

The first device monitors network communication, and when it detects that an attack has been made on the first vehicle, it transmits a command (first command) instructing the second device to start a honeypot server that simulates the vehicle system of the first vehicle. Further, the first device transmits a second command for transferring the packet according to the attack to the second device to the communication device that relays communication to the first vehicle. Examples of the communication device include a network switch on a path through which the packet pertaining to the attack passes.

The second command can be, for example, a command for rewriting the destination of a packet transmitted from the attack source device to the first vehicle from the first vehicle to the second device. Thereby, packets related to the attack addressed to the first vehicle can be transferred to the second device.

The communication device that has received the second command replaces, for example, the destination of the packet transmitted from the attack source device to the first vehicle (eg, the destination IP address included in the IP header) with an IP address corresponding to the second device. As a result, all packets transmitted from the attack source device are directed to the honeypot server running on the second device.

Since the honeypot server simulates the vehicle system of the first vehicle (on-board computer system), the first vehicle can be protected from attacks without the attacker realizing that the communication partner is not the first vehicle.

The second command may be a command that causes the communication device to replace the destination of the packet transmitted from the attack source device to the first vehicle from the IP address of the first vehicle to the IP address of the second device, as described above.

Further, the second command may be a command that causes the communication device to replace the source of packets transmitted from the second device to the attack source device from the IP address of the second device to the IP address of the first vehicle.

According to such a configuration, the source of packets sent from the second device (honeypot server) is replaced by the IP address of the first vehicle, so that it can be concealed that the honeypot server is responding.

Further, the first command may further include information about the first vehicle (first information). The first piece of information is typically information necessary to simulate the first vehicle.

When responding to an attack by a honeypot server, if the model and model name of the simulated vehicle are different from the actual vehicle, the attack may be noticed. Therefore, according to the first command, information about the first vehicle may be transmitted to the second device, and the second device may operate the honeypot server based on this. Thereby, for example, the honeypot server can simulate the vehicle make and model of the target vehicle, and the risk of being noticed by the attacker can be reduced.

The first information may include data related to the running of the first vehicle in addition to information on the first vehicle itself (such as vehicle type and model name). For example, if the current position and speed of the first vehicle can be acquired, the honeypot server may simulate the running of the first vehicle using this information. Thereby, the virtual first vehicle can behave to the honeypot server as if it were traveling in the same place as the actual vehicle.

Further, the first device may instruct the second device to stop the honeypot server when it is determined that the attack on the first vehicle is stopped. According to such a configuration, since the honeypot server operates only while the attack is occurring, computing resources can be saved.

Specific embodiments of the present disclosure will be described below on the basis of the drawings. The hardware configuration, module configuration, functional configuration, etc. described in each embodiment are not intended to limit the technical scope of disclosure to them unless otherwise specified.

First Embodiment

An outline of the communication system according to the first embodiment will be described with reference to FIG. 1 The communication system according to the present embodiment is a system in which the vehicle 10 on which the in-vehicle device 100 is mounted is connected to the network by wireless. The system may include a plurality of vehicles 10 (in-vehicle devices 100).

The vehicle 10 is a connected car having a wireless communication function. The vehicle 10 is equipped with an in-vehicle device 100.

The in-vehicle device 100 can connect to a predetermined wireless network (hereinafter referred to as a vehicle network) and communication with any device via the Internet. The vehicle network may be a mobile communication network using a cellular communication method, or a wireless communication network using Wi-Fi (registered trademark) or Bluetooth (registered trademark).

The vehicle network is connected with the Internet. Further, a server device 600 for providing a predetermined service to the in-vehicle device 100 is disposed on the Internet. In this example, although an example in which a vehicle network and the Internet are connected, a wide area network other than the Internet or a private network may be connected to the vehicle network.

The vehicle network includes an access point that performs wireless communication with the in-vehicle device 100 and a relay device 300 for relaying packets. The access point is a device that provides wireless access to a vehicle network. If the vehicle network is a mobile communication network, the access point is a base station. The relay device 300 is connected to an access point. Packets destined for the in-vehicle device 100 pass through the relay device 300.

Further, an attack detection device 200 (first device) and a decoy device 400 (second device) are disposed in the vehicle network.

The attack detection device 200 detects that an attack has been made on the vehicle 10 (in-vehicle device 100) connected to the vehicle network, and executes a predetermined process for dealing with the attack. The decoy device 400 is a device that processes packets related to the attack on behalf of the in-vehicle device 100 that is the target of the attack. On the decoy device 400, a honeypot server is configured to be executable.

Specific methods for dealing with attacks will be discussed below.

The in-vehicle device 100 is a computer for collecting and providing information. In the present embodiment, the in-vehicle device 100 has a function of collecting information related to the running of the vehicle 10 and transmitting it to the server device 600 and a function of providing information to the occupants of the vehicle 10 based on the information received from the server device 600.

The in-vehicle device 100 may be a device (for example, a car navigation device) that provides intonation to the occupants of the vehicle 10, or an electronic control unit (ECU) provided by the vehicle 10. Further, the in-vehicle device 100 may be a data communication module (DCM) having a communication function.

The in-vehicle device 100 can be configured as a computer having a processor such as a CPU or GPU, a main memory such as RAM or ROM, and an auxiliary storage device such as an EPROM, a hard disk drive, or removable media. The auxiliary storage device stores an operating system (OS), various programs, various tables, and the like, and by executing the programs stored therein, each function corresponding to a predetermined purpose can be realized as described later. However, some or all functions may be realized by hardware circuits such as ASICs and FPGAs.

Figure 2:
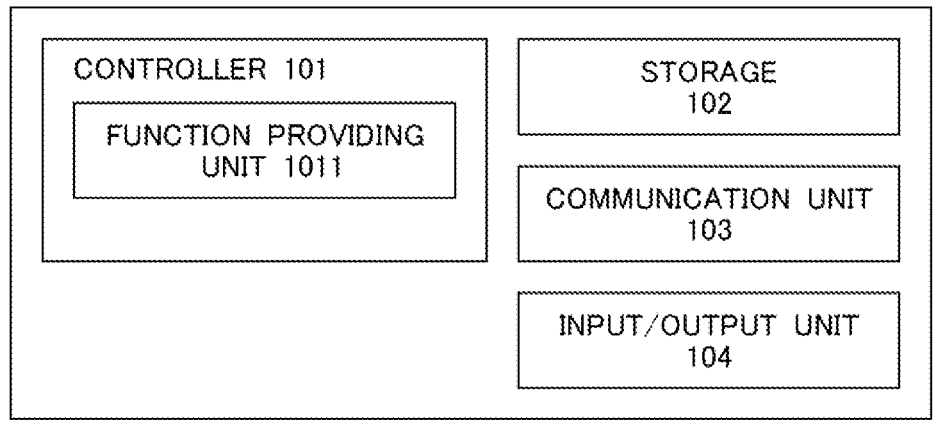
FIG. 2 is a diagram showing a component of an in-vehicle device.

FIG. 2 is a diagram showing a component of the in-vehicle device 100.

The in-vehicle device 100 includes a controller 101, a storage 102, a communication unit 103, and an input/output unit 104.

The controller 101 is an arithmetic unit that realizes various functions of the in-vehicle device 100 by executing a predetermined program. The controller 101 may be realized by, for example, a CPU or the like.

The controller 101 has a function providing unit 1011 as a functional module. The functional module may be realized by executing the stored program by the CPU.

The function providing unit 1011 executes various functions provided by the in-vehicle device 100. Examples of the functions provided by the in-vehicle device 100 include the following.

Navigation Function

The navigation function is a function of providing route navigation based on the map data provided by the server device 600.

Traffic Information Provision Function

The traffic information provision function is a function that acquires and provides traffic information from the server device 600. Traffic information may be provided to the occupants of the vehicle 10 or to an electronic control unit that controls autonomous or semi-autonomous driving of the vehicle 10.

Data Transmission Function

The data transmission function is a function of collecting information (speed information, position information, etc.) related to the running of the vehicle 10 and transmitting it to the server device 600.

These functions can be provided, for example, via the input/output unit 104 (touch panel). Further, in order to provide these functions, the in-vehicle device 100 may have a GPS antenna, a GPS module, or the like.

The function providing unit 1011 is configured to be able to perform these functions by communication with the server device 600.

The storage 102 is a memory device including a main memory and an auxiliary storage device. The auxiliary storage device stores an operating system (OS), various programs, various tables, and the like, and by loading and executing the programs stored therein into the main memory, each function that matches a predetermined purpose as described later can be realized.

The main memory may include RAM (Random Access Memory) or ROM (Read Only Memory). The auxiliary storage device may include an EPROM (Erasable Programmable ROM) or a hard disk drive (HDD, Hard Disk Drive). Further, the auxiliary storage device may include removable media, ie portable recording media.

The communication unit 103 denotes a wireless communication interface for connecting the in-vehicle device 100 to the vehicle network. The communication unit 103 is configured to be able to communicate with the vehicle network by, for example, a communication standard such as mobile communication, wireless LAN, and Bluetooth (registered trademark).

The input/output unit 104 is a means for receiving input operations performed by the user of the device and presenting information. In the present embodiment, it consists of one touch panel display. That is, it is composed of a liquid crystal display and its control means, a touch panel and its control means.

Next, the attack detection device 200 will be described. The attack detection device 200 has a function of monitoring communication to a plurality of vehicles 10 (in-vehicle device 100) connected to the vehicle network, and a function of determining that an attack is being performed on one vehicle based on the monitoring result.

The attack detection device 200 may be part of an IDS (Intrusion Detection System) or an IPS (Intrusion Prevention System).

When an attack is detected, the attack detection device 200 generates a command (first command: hereinafter referred to as a transfer command) for changing the destination of the packet pertaining to the attack and transmits it to the relay device 300. The relay device 300 changes the destination of the packet related to the attack from the in-vehicle device 100 to the decoy device 400 according to the transfer command. Thereby, the packet related to the attack is transferred to the decoy device 400.

Further, when an attack is detected, the attack detection device 200 generates a command (second command: hereinafter referred to as a activation command) for activating the honeypot server to the decoy device 400 and transmits it to the decoy device 400.

The attack detection device 200 can be configured as a computer having a processor such as a CPU or GPU, a main memory such as RAM or ROM, and an auxiliary storage device such as an EPROM, a hard disk drive, or removable media. The attack detection device 200 may be configured in a single computer or configured by a plurality of computers that cooperate with each other.

Figure 3:
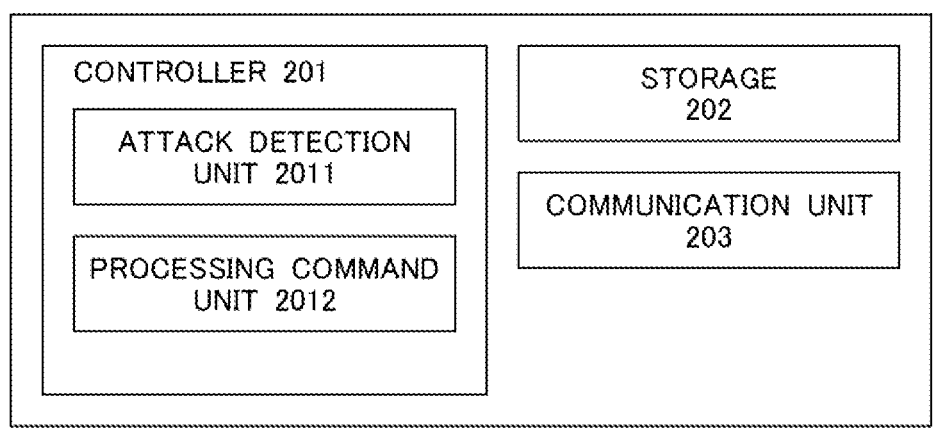
FIG. 3 is a diagram showing components of an attack detection device.

FIG. 3 is a diagram showing components of the attack detection device 200. The attack detection device 200 includes a controller 201, a storage 202, and a communication unit 203.

The controller 201 is an arithmetic unit that controls the control performed by the attack detection device 200. The controller 201 can be realized by an arithmetic processing unit such as a CPU.

The controller 201 is configured to have two functional modules, an attack detection unit 2011 and a processing command unit 2012. Each function module may be realized by executing a program stored in the auxiliary storage means by the CPU.

The attack detection unit 2011 determines the content of communication performed on the plurality of in-vehicle devices 100 connected to the vehicle network by monitoring packets passing through the relay device 300, and determines that an attack is being performed on any of the in-vehicle devices 100. The attack is carried out, for example, from a vehicle network or an attack source device connected to the Internet. It can be determined by known techniques that an attack is taking place. For example, a method for comparing the contents of a packet passing through the relay device 300 with a predetermined attack pattern is known.

When the attack detection unit 2011 determines that an attack is being performed on any of the in-vehicle devices 100, the attack detection unit 2011 specifies the IP address of the attack source device and the IP address of the in-vehicle device 100 (hereinafter referred to as an attacked device) that is the target of the attack based on the contents of the packet related to the attack.

The processing command unit 2012 takes measures to deal with the attack when the attack detection unit 2011 detects an attack.

Specifically, the processing command unit 2012 first issues a transfer command to the relay device 300 for transferring the packet to the decoy device 400 by rewriting the IP header of the packet related to the attack. For example, the processing command unit 2012 instructs the relay device 300 to rewrite the IP header in order to transfer the packet whose source is the IP address of the attack source device and whose destination is the IP address of the attack target device to the device 400 instead of the in-vehicle device 100.

Specifically, for a packet whose source is the IP address of the attack source device and whose destination is the IP address of the attack target device, the processing command unit 2012 issues a command to rewrite the destination from the IP address of the attack target device to the IP address of the device 400. As a result, the packet related to the attack is transferred to the in-vehicle device 400 instead of the in-decoy device 100 of the attack target.

Further, the processing command unit 2012 secondly issues a start command instructing the decoy device 400 to start the honeypot server.

By executing these two processes, the honeypot server is started in the decoy device 400 and the packet related to the attack can be directed to the decoy device 400. That is, the attack can be nullified by the honeypot server.

The storage 202 includes a main memory and an auxiliary storage device. The main memory is a memory in which a program executed by the controller unit 201 and data used by the control program are deployed. The auxiliary storage device is a device that stores a program executed in the controller 201 and data used by the control program.

The communication unit 203 is a communication interface for connecting the attack detection device 200 to the vehicle network. The communication unit 203 includes, for example, a network interface board or a wireless communication circuit for wireless communication.

Next, the relay device 300 will be described. The relay device 300 is a device that relays packets transmitted and received to the in-vehicle device 100 wirelessly connected to the vehicle network. The relay device 300 is disposed, in the vehicle network, at a position where all packets destined for the in-vehicle device 100 pass.

Further, the relay device 300 has a function of rewriting the destination address and the transmission source address included in the IP header of the passing packet based on the transfer command received from the attack detection device 200.

Similar to the attack detection device 200, the relay device 300 can also be configured as a computer having a processor such as a CPU and a GPU, a main memory such as RAM or ROM, and an auxiliary storage device such as an EPROM, a hard disk drive, and a removable media.

Figure 4:
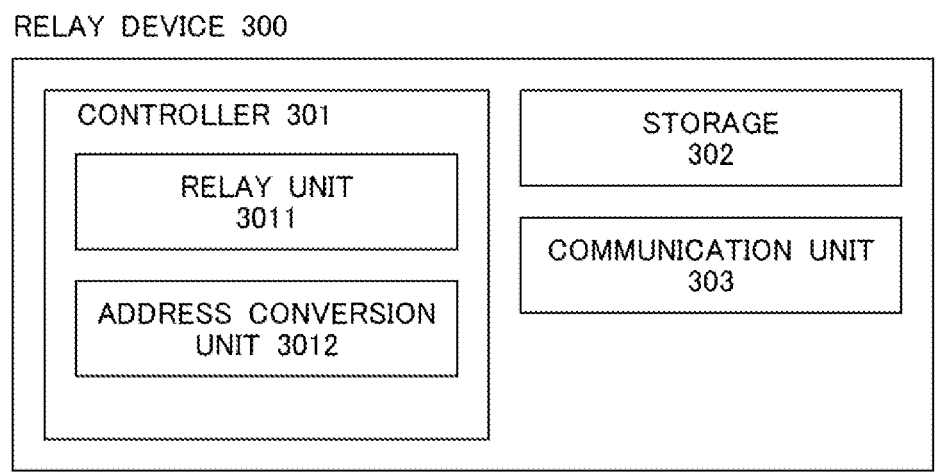
FIG. 4 is a diagram showing components of a relay device.

FIG. 4 is a diagram showing components of the relay device 300. The repeater 300 includes a controller 301, a storage 302, and a communication unit 303.

The controller 301 is an arithmetic unit that controls the control performed by the relay device 300. The controller 201 can be realized by an arithmetic processing unit such as a CPU. The controller 301 has a relay unit 3011 and an address conversion unit 3012 as a functional module. The functional module may be realized by executing a program stored in the auxiliary storage means by the CPU.

The relay unit 3011 relays packets addressed to the in-vehicle device 100 connected to the vehicle network. The packets may be transmitted from an external network such as the internet or may be transmitted from within the vehicle network. Further, the relay unit 3011 has a function of changing the relay destination of the packets based on the translation table described later.

The address conversion unit 3012 generates a table (translation table) for performing address translation based on the transfer command received from the attack detection device 200 and rewrites the IP header included in the passing packet based on the translation table.

Figure 5:
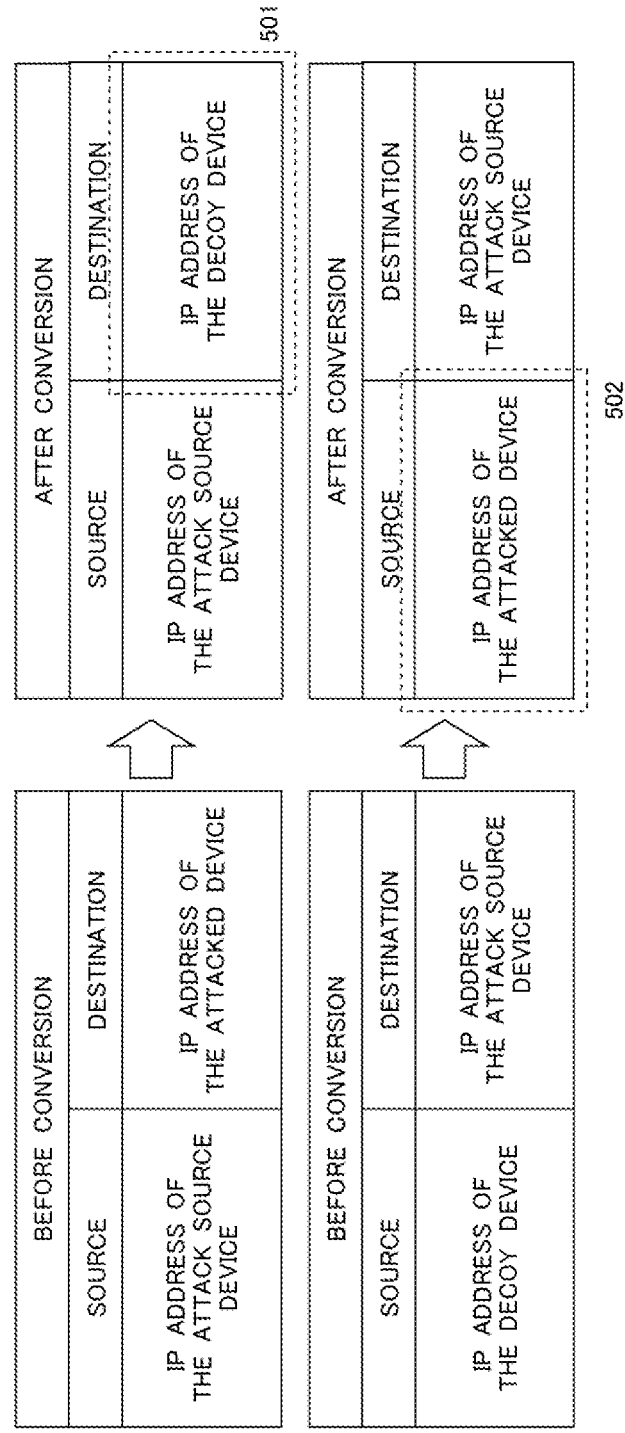
FIG. 5 is an example of a translation table generated by a relay device.

FIG. 5 is a diagram illustrating an example of a translation table generated based on the transfer command. When the address conversion unit 3012 receives a packet having an IP header having the contents shown in "before conversion", the IP header of the packet is rewritten as shown in "after conversion".

Here, the transfer command includes an IP address of the attack source device and an IP address of the attacked device.

The address conversion unit 3012 that has received the transfer command generates a translation table for rewriting the destination and the source included in the IP header. Specifically, for packets whose source is an IP address of the attack source device and the destination is an IP address of the attacked device, the destination is rewritten to the IP address (reference numeral 501) of the decoy device 400. The address conversion unit 3012 rewrites the IP address included in the IP header of the passing packets based on the translation table. IP address rewriting can be realized using the NAT (Network Address Translation) function.

When the packets in which the IP header has been rewritten are processed by the relay unit 3011, all packets transmitted from the attack source device and addressed to the attacked device are transmitted to the decoy device 400.

Further, for packets whose source is the IP address of the decoy device and the destination is the IP address of the attack source device, the address conversion unit 3012 rewrites the source to the IP address (reference numeral 502) of the attacked device.

Thereby, the source IP address of the packets transmitted from the decoy device 400 and destined for the attack source device is disguised as the IP address of the attacked device.

When packets having an IP header rewritten by the address conversion unit 3012 pass through the relay unit 3011, all packets transmitted from the attack source device to the attacked device are received by the decoy device 400 (honeypot server). In addition, the source of the packet transmitted from the honeypot server is disguised as the attacked device. That is, even from the viewpoint of the attack source device, it becomes difficult to determine that the packet is being processed by the honeypot server.

Since the storage 302 and the communication unit 303 are the same as those of the storage 202 and the communication unit 203, description thereof will be omitted.

Next, the decoy device 400 will be described. The decoy device 400 is a device that processes packets related to the attack transmitted from the attack source device. The decoy device 400 is configured to make the honeypot server executable by software. The honeypot server processes the packet related to the attack. The honeypot server is a virtual server device that simulates the in-vehicle device 100.

Like the attack detection device 200, the decoy device 400 can be configured as a computer having a processor such as a CPU and a GPU, a main storage device such as RAM or ROM, and an auxiliary storage device such as an EPROM, a hard disk drive, or removable media.

Figure 6:
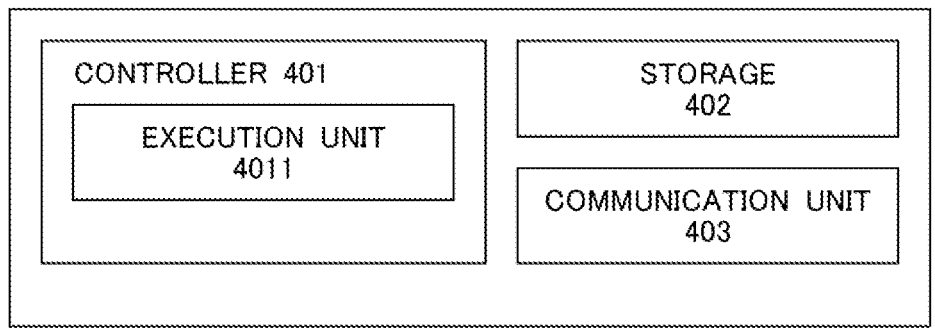
FIG. 6 is a diagram showing the components of a decoy device.

FIG. 6 is a diagram showing components of the decoy device 400. The decoy device 400 includes a controller 401, a storage 402, and a communication unit 403.

The controller 401 is an arithmetic unit that controls the control performed by the decoy device 400. The controller 401 can be realized by an arithmetic processing device such as a CPU.

The controller 401 has an execution unit 4011 as a functional module. The functional module may be realized by executing a program stored in the auxiliary storage means by the CPU.

The execution unit 4011 executes a honeypot server simulating the in-vehicle device 100 that is the attacked device based on the activation command received from the attack detection device 200.

The activation command may include information on the in-vehicle device 100 (or the vehicle 10 on which the in-vehicle device 100 is mounted) that is the attacked device. For example, the execution unit 4011 can simulate the operation of the in-vehicle device 100 using the vehicle model, model name, and the like of the vehicle 10 included in the activation command. Further, when the functions of the in-vehicle device 100 are executed by a virtual machine, the execution unit 4011 may acquire an instance of the virtual machine and execute a honeypot server using the instance.

Since the storage 402 and the communication unit 403 are the same as those of the storage 202 and the communication unit 203, description thereof will be omitted.

Note that the configurations shown in FIG. 2, FIG. 3, FIG. 4, and FIG. 6 are examples, and all or part of the illustrated functions may be performed using a specially designed circuit. Further, the program may be stored or executed by a combination of a main memory and an auxiliary storage device other than those shown.

Next, the flow of responding to an attack using the attack detection device 200, the relay device 300, and the decoy device 400 will be described in more detail.

Figure 7:
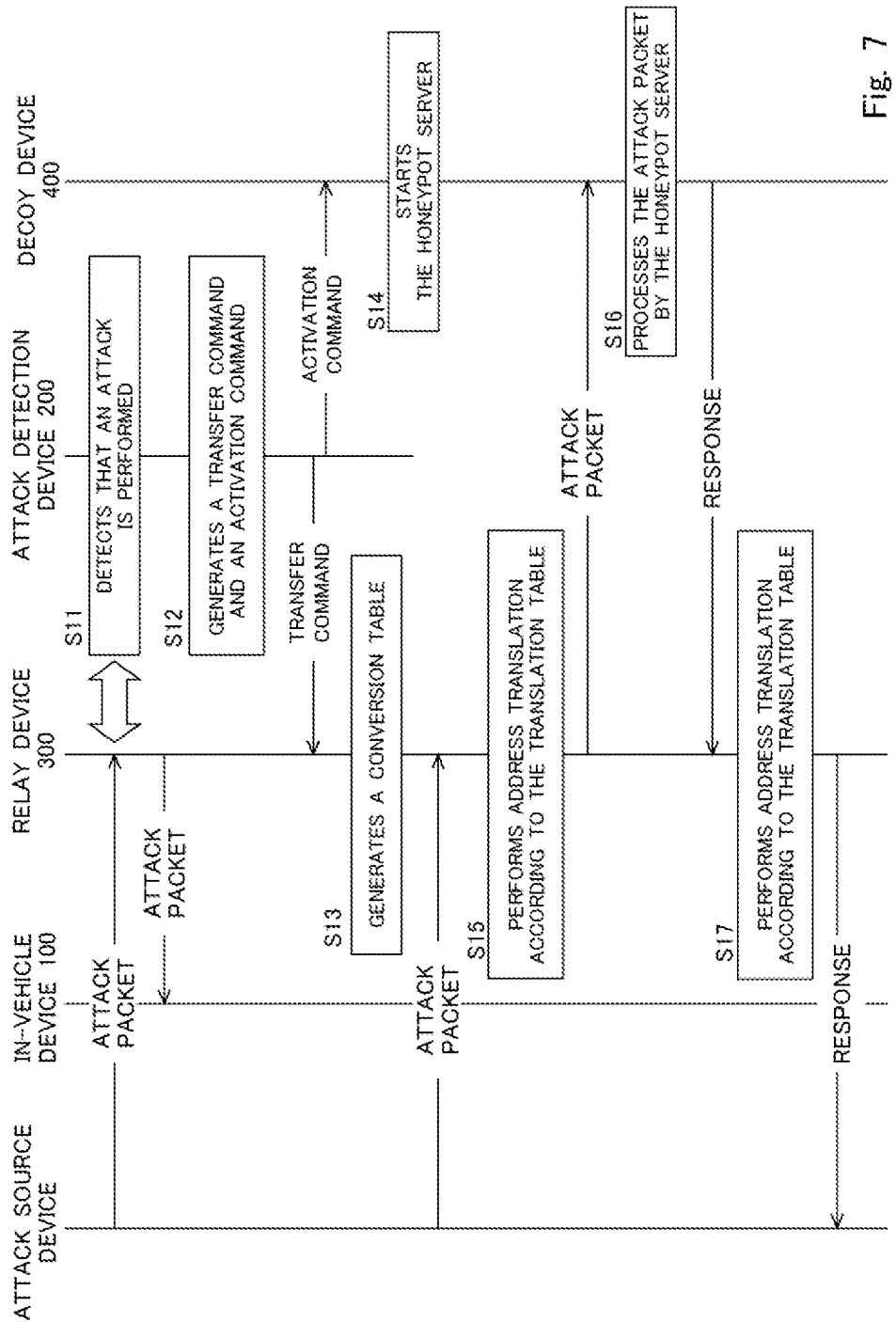
FIG. 7 is a sequence diagram of processing performed in the first embodiment.

FIG. 7 is a sequence diagram of a process executed in the system when an attack occurs.

When an attack is performed on the predetermined in-vehicle device 100 from the attack source device, the attack detection device 200 detects this (step S11). Attack detection can be performed, for example, by monitoring packets passing through the relay device 300.

The attack detection device 200 generates a transfer command and a activation command when an attack is detected. Specifically, the attack detection device 200 generates a transfer command including the IP address of the attack source device and the IP address of the in-vehicle device 100 that is the attacked device, and transmits it to the relay device 300 (step S12). The relay device 300 that has received the transfer command generates a conversion table as described in FIG. 5 based on the transfer command (step S13).

Further, the attack detection device 200 generates an activation command for activating the honeypot server and transmits it to the decoy device 400. The decoy device 400 that has received the activation command starts the honeypot server (step S14).

When a packet related to the attack is subsequently transmitted from the attack source device, the relay device 300 performs address translation according to the translation table (step S15). Thereby, the destination IP address of the packet pertaining to the attack is rewritten from the IP address of the in-vehicle device 100 that is the attacked device to the IP address of the decoy device 400. Further, when the packet is transmitted by the relay unit 3011, the packet reaches the decoy device 400.

The decoy device 400 processes the packet by the honeypot server (step S16). Specifically, the honeypot server behaves as if the in-vehicle device 100 responds with the packet related to the attack, and generates a response. The response is transmitted to the relay device 300.

When the response is transmitted from the decoy device 400, the relay device 300 rewrites the IP header according to the conversion table (step S17). Thereby, the IP address of the source included in the response is rewritten from the IP address of the decoy device 400 to the IP address of the in-vehicle device 100 that is the attacked device. The converted response is transmitted to the attack source device via the relay unit 3011.

Figure 8:
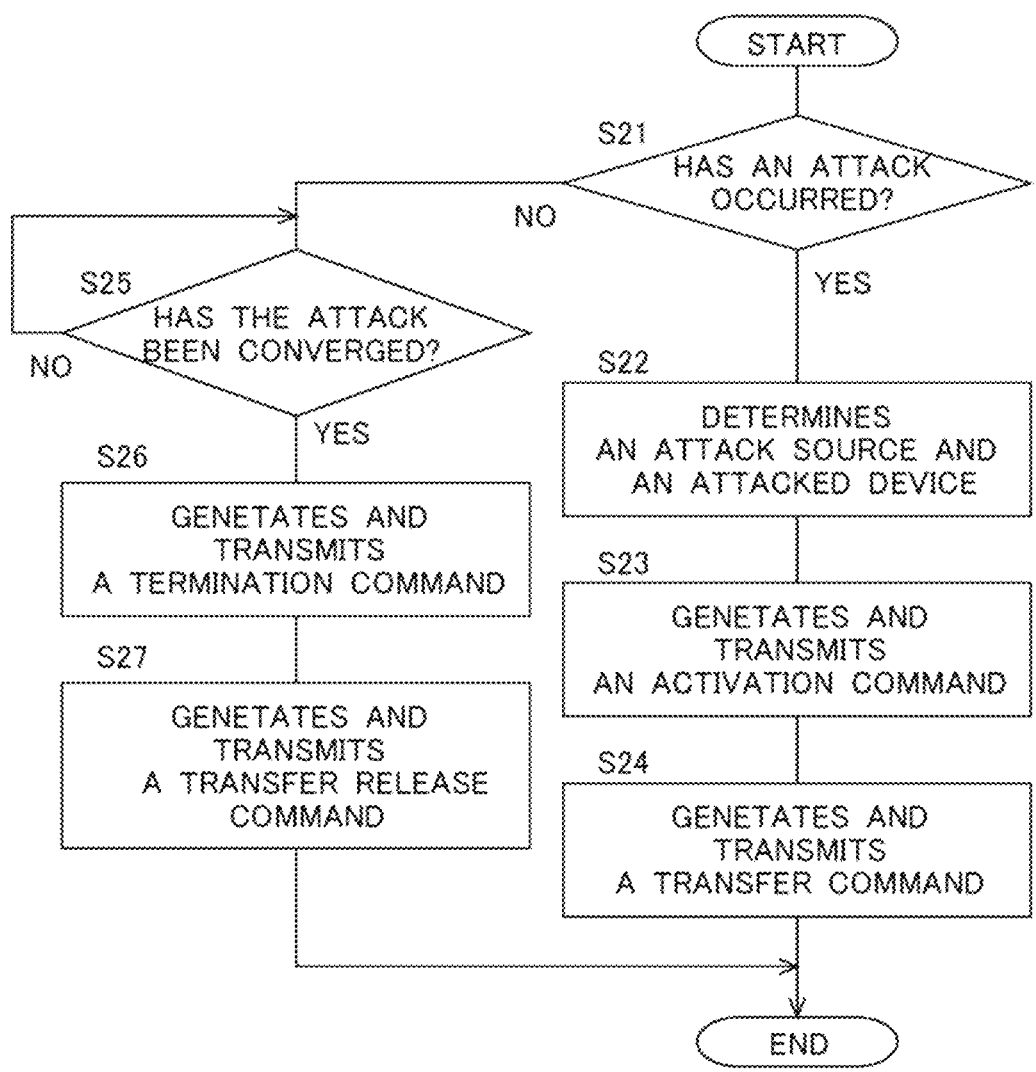
FIG. 8 is a flowchart of a process executed by the attack detection device.

FIG. 8 is a flowchart of a process executed by the attack detection device 200. As described above, the attack detection device 200 has a function of detecting an attack and starting a response to the attack, as well as a function of detecting the convergence of the attack and performing post-processing. The illustrated process is performed periodically.

First, in step S21, the attack detection unit 2011 determines that an attack on any of the in-vehicle devices 100 has occurred. If it is determined that an attack has occurred, the process moves to step S22.

In step S22, the attack detection unit 2011 determines the IP address of an attack source device and the IP address of an attacked device.

Next, in step S23, the processing command unit 2012 generates an activation command and transmits it to the decoy device 400. The activation command may include information about the vehicle 10 or the in-vehicle device 100 that is the attack target.

Next, in step S24, the processing command unit 2012 generates a transfer command and transmits it to the relay device 300. The transfer command includes the IP address of the attack source device and the IP address of the attacked device.

If it is not determined that an attack has occurred in step S21, the process moves to step S25.

In step S25, the attack detection unit 2011 determines whether or not an attack has already taken place and the attack has been converged. In this step, for example, when the attack is not performed for a certain time or more (communication from the attack source does not occur or an attack packet is not detected), it can be determined that the attack has converged. If it is determined that the attack has converged, the process moves to step S26. If the attack has not converged, the process is repeated.

In step S26, the processing command unit 2012 generates a termination command and transmits it to the decoy device 400. The termination command is a command to terminate the operation of the running honeypot server. Thereby, the execution of the honeypot server by the decoy device 400 is terminated.

In step S27, the processing command unit 2012 generates a transfer release command and transmits it to the relay device 300. The transfer release command is a command to the relay device 300 to delete the translation table. Thereby, the transfer of the packets to the decoy device 400 by the relay device 300 is terminated.

As described above, in the communication system according to the first embodiment, when the attack detection device 200 detects an attack on any of the in-vehicle devices 100, the decoy device 400 is instructed to start the honeypot server, and the relay device 300 is instructed to start packets transfer.

The honeypot server simulates the in-vehicle device 100 that is the attacked device, and the relay device 300 rewrites the IP header. Therefore, the packets related to the attack can be processed without the attacker realizing that the guidance to the honeypot has started.

Second Embodiment

In the second embodiment, the attack detection device 200 notifies the decoy device 400 of information about the running of the vehicle 10 on which the in-vehicle device 100 being attacked is mounted. Then, the decoy device 400 executes a honeypot server based on the information notified from the attack detection device 200.

When the connected vehicle is the target of the attack, the attacker may monitor the behavior of the vehicle 10 and the like in order to confirm the result of the attack. However, if the honeypot server does not respond as expected by the attacker, the attacker may change his technique and continue the attack. That is, the honeypot server does not only simulate the response of the in-vehicle device 100, but preferably also simulates the running of the vehicle 10. Therefore, in the present embodiment, the attack detection device 200 includes information (hereinafter referred to as vehicle information) related to the running of the target vehicle 10 in the activation command. Then, the decoy device 400 simulates, by the honeypot server, the running of the vehicle 10 using the vehicle information.

Examples of the vehicle information include position information, traveling direction, or speed of the vehicle 10. The vehicle information may include other intonation. The attack detection device 200 collects vehicle information corresponding to the vehicle 10 at the timing when the attack is detected, and transmits the activation command including this vehicle information to the decoy device 400. Further, the honeypot server executed by the decoy device 400 virtually simulates the running of the vehicle 10 based on the vehicle information included in the start command. The honeypot server may virtually simulate the behavior of the attacked vehicle 10 and return a response to the attack.

According to such a form, it becomes possible to provide the attacker with false data indicating the outcome of the attack.

Modification

The above embodiment is only an example, and the present disclosure can be appropriately changed and implemented within the range that does not deviate from the gist thereof. For example, the processes and means described in the present disclosure can be freely combined as long as no technical contradiction occurs.

In the description of the embodiment, the attack detection device 200 and the in-vehicle device 100 are exemplified as separate devices, but the attack detection device 200 and the in-vehicle device 100 may be the same device. In this case, when the in-vehicle device 100 detects that its own device is being attacked, it notifies the relay device 300 and the decoy device 400 to that effect, and in response, each device may start processing from step S13 onwards.

Furthermore, even when the attack detection device 200 and the in-vehicle device 100 are different bodies, the in-vehicle device 100 may detect an attack by itself. In this case, the in-vehicle device 100 may notify the attack detection device 200 that its own device is being attacked, and the attack detection device 200 that has received the notification may start the processing from step S12 onwards.

Further, the attack detection device 200 may be divided into a device that only detects the attack and a device that issues the first command and the second command based on the detection result.

Further, the relay device 300 may be divided into a device that generates a translation table based on the first command and a communication device that pertains address translation based on the translation table.

Further, the decoy device 400 may log the contents of the attack received. This makes it possible to gather detailed information about the attack.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), and any type of medium suitable for storing electronic instructions, such as read-only memories (ROMs), random access memories (RAMs), EPROMs, EEPROMs, magnetic cards, flash memories, or optical cards.

What is claimed is:

1. An attack detection system comprising a first device and a second device, wherein
the first device having a first controller configured to execute:
monitoring communication to a first vehicle connected to a network, and
when it is detected that an attack on the first vehicle is being carried out from an attack source device, transmitting a first command for activating a honeypot server simulating a vehicle system of the first vehicle to the second device and transmitting a second command for transferring packets related to the attack, the packets being transmitted from the attacking device to the first vehicle, to the second device to a communication device that relays communication to the first vehicle in the network, and
the second device having the second controller configured to execute:
processing, by the honeypot server, the packets related to the attack, the packets being transmitted from the attack source device to the first vehicle and transferred to the second device by the communication device, wherein:

the first command further includes position information of the first vehicle, traveling direction of the first vehicle or speed of the first vehicle as first information about a running of the first vehicle, and the second device, as a process related to the attack, causes the honeypot server to simulate the running of the first vehicle based on the first information and transmits packets related to a simulation of the running of the first vehicle as a response to the attack.

2. The attack detection system according to claim 1, wherein the second command includes a command to cause, when the communication device receives the packets related to the attack in which a first IP address corresponding to the attack source device is the source and a second IP address corresponding to the first vehicle is the destination, the destination contained in the packets related to the attack to be replaced by a third IP address corresponding to the second device from the second IP address.

3. The attack detection system according to claim 2, wherein the second command further includes a command to cause, when the communication device receives the packets related to the simulation of the running of the first vehicle in which the third IP address is the source and the first IP address is the destination, the source contained in the packets related to the simulation of the running of the first vehicle to be replaced by the second IP address from the third IP address.

4. The attack detection system according to claim 1, wherein when the attack on the first vehicle is stopped, the first controller transmits a third command for causing to stop the honeypot server to the second device.

* * * * *